(12) United States Patent
Ge et al.

(10) Patent No.: US 9,086,980 B2
(45) Date of Patent: Jul. 21, 2015

(54) DATA PROCESSING, METHOD, DEVICE, AND SYSTEM FOR PROCESSING REQUESTS IN A MULTI-CORE SYSTEM

(75) Inventors: Yi Ge, Beijing (CN); Rui Hou, Beijing (CN); Kun Wang, Beijing (CN); Hong Bo Zeng, Beijing (CN); Yu Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 13/564,350

(22) Filed: Aug. 1, 2012

(65) Prior Publication Data
US 2014/0040555 A1    Feb. 6, 2014

(51) Int. Cl.
*G06F 12/08*    (2006.01)

(52) U.S. Cl.
CPC ......... *G06F 12/0895* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 5,307,495 A | | 4/1994 | Seino et al. |
| 5,522,058 A | * | 5/1996 | Iwasa et al. ................... 711/145 |
| 6,751,706 B2 | | 6/2004 | Chauvel et al. |
| 6,865,647 B2 | | 3/2005 | Olarig et al. |
| 7,076,609 B2 | | 7/2006 | Garg et al. |
| 7,103,748 B2 | | 9/2006 | Day et al. |
| 7,475,219 B2 | | 1/2009 | O'Connor et al. |
| 7,502,913 B2 | | 3/2009 | Barham |
| 2004/0230976 A1 | | 11/2004 | Slegel et al. |
| 2004/0268044 A1 | | 12/2004 | Heller, Jr. et al. |
| 2005/0114592 A1 | * | 5/2005 | Jin et al. ........................ 711/113 |
| 2006/0143408 A1 | | 6/2006 | Sistla |
| 2006/0282622 A1 | | 12/2006 | Sistla et al. |
| 2007/0067382 A1 | | 3/2007 | Sun |
| 2007/0156971 A1 | | 7/2007 | Sistla et al. |
| 2008/0147986 A1 | | 6/2008 | Chinthamani et al. |
| 2009/0113140 A1 | | 4/2009 | Quach |

FOREIGN PATENT DOCUMENTS

| | | |
|---|---|---|
| CN | 101349996 A | 1/2009 |
| WO | WO 2011051074 | 5/2011 |

OTHER PUBLICATIONS

English language Abstract CN101349996A, Jan. 21, 2009.

* cited by examiner

*Primary Examiner* — Gary Portka
(74) *Attorney, Agent, or Firm* — Scully, Scott, Murphy & Presser, P.C.; Jennifer Davis, Esq.

(57) ABSTRACT

The present disclosure provides a method, device, and system for processing a request in a multi-core system. The method comprises steps of: receiving a request for data by a filter from a requesting unit; comparing an indicator indicative of a logical partition in the request with an indicator indicative of the logical partition in a record of the filter; searching in a unit where the filter is located based on the request and returning a search result to the requesting unit if a comparison result matches; and returning a NONE response to the requesting unit from the filter if the comparison result does not match.

18 Claims, 8 Drawing Sheets

DATA PROCESSING, METHOD, DEVICE, AND SYSTEM FOR PROCESSING REQUESTS IN A MULTI-CORE SYSTEM

TECHNICAL FIELD

The present invention relates to the field of data processing in a computer system, and in particular, relates to a data processing method, device, and system for processing requests in a multi-core system.

BACKGROUND ART

Figure 1:
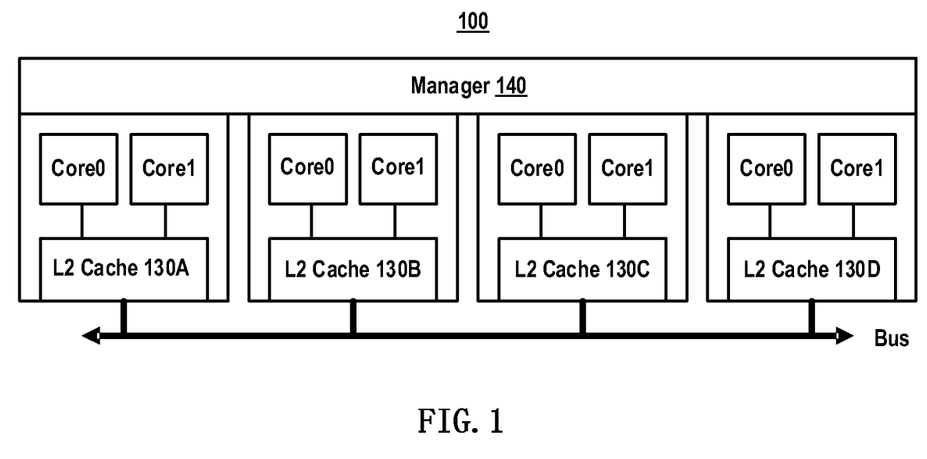
FIG. 1 shows a multi-core system having a cache coherence mechanism.

With multi-core system (also called chip-multi-processor (CMP)) having gradually become a main trend for current computer system and with the constant development of virtualization, the design of L2 cache develops accordingly. The typical structure of a multi-core system is shown in FIG. 1. In the multi-core system, each core on a processor has a private L1 cache (not shown in FIG. 1) for holding some data. Besides, multiple cores may share one L2 cache, and then a plurality of L2 caches 130A, 130B, 130C, and 130D may form a cache coherence system. In other words, the current computer system has a cache coherence mechanism. Under the control of a manager 140, the cache coherence mechanism is essentially used to help the system to maintain data coherence, which means if more than one backup of a data block is located in more than one L1 and L2 caches at the same time, the coherence mechanism may guarantee that the values of all backups at each time are completely identical.

The process of the cache coherence mechanism may be described as follows:

Firstly, for example, a core 1 on the L2 cache 130B intends to load a data block and searches the data block in its private L1 cache A (not shown). Then, if backup of the data block is found in the private L1 or L2 cache 130B, then the data loading process ends, and the coherence process will not be called. However, if backup of the data block is not found in the private L1 or L2 cache 130B, then the coherence process will be called. The request for the data block will be transmitted by the L2 cache 130B to all other L2 caches 130A, 130C, and 130D. Next, the L2 caches 130A, 130C, and 130D will search the requested data block in their own arrays. If one of the caches finds a backup, then the cache which finds the backup will issue a confirmation message to the L2 cache 130B. Meanwhile, the cache which finds the backup will remove its own data backup so as to guarantee that the values of the data block in all caches are identical. However, if none of other L2 caches 130A, 130C, and 130D finds the backup of the data block, then a memory will issue the data to the L2 cache 130B. All in all, the cache coherence mechanism aims to enabling data backups among all L2 caches to be completely identical, thereby achieving coherency of data.

Thus, in a current multi-core system having a cache coherence mechanism, upon occurrence of a request for data, it is required to access all L2 caches, which results in consuming considerable power. In fact, in most situations, a request for data cannot be found in other L2 caches than the L2 cache which issues out the data request, thus in the current system, the process of searching said data in all other L2 caches based on the request is totally unnecessary. Such searching process will waste about 30% to 40% of the power of L2 caches.

There are already some solutions to alleviate the above problems in the prior art. One solution thereof is based on a hash table. This solution uses a hash table to encode and record logical partition IDs (LPID) of all logical partitions running on L2 caches. When a data request is received, the LPID attached to the data request is extracted through a hash function and mapped to a value. The value then is compared with all entries recorded in the hash table. However, due to inherent substantive defects of the hash table, such filtration cannot realize an accurate mapping and has high false positives, thereby reducing power efficiency. Another solution is based on historical records of data access. This solution uses a historical record table for maintaining records of data access. However, the filtration ratio obtained through this solution depends on the size of the historical record table too much extent. The more the requests for filtration are, the larger should be the size of the table. Thus, it is easily seen that a large-sized historical record table per se will cost hardware module size and power consumption. Thus, in order to reduce power consumption, it is desirable to provide a system and method for reducing and even eliminating the above-mentioned unnecessary and vain process of searching L2 caches.

SUMMARY OF THE INVENTION

In order to achieve the object of enabling a processor to have a high processing speed and enabling caches to have low power consumption, a practical method is to filter the request for data issued to caches, so as to eliminate unnecessary search to caches. An object of the present invention is to provide a method, device and system to implement the above objects with a filter mechanism in caches.

An object of the present invention is to provide a pipe stage-based data processing method, device and system.

According to an aspect of the present invention, there is provided a method for processing a request in a multi-core system, comprising steps of: receiving a request for data by a filter from a requesting unit; comparing an indicator indicative of a logical partition in the request with an indicator indicative of a logical partition in a record of the filter; searching in a unit where the filter is located based on the request and returning a search result to the requesting unit if the comparison result matches; and returning a NONE response to the requesting unit from the filter.

According to another aspect of the present invention, there is provided a device for processing a request in a multi-core system, comprising: a filter configured to receive a request for data transmitted from a requesting unit and to compare an indicator indicative of a logical partition in the request with an indicator indicative of a logical partition in a record of the filter; wherein the filter is further configured to search in a unit where the filter is located based on the request and return a search result to the requesting unit if the comparison result matches; and to return a NONE response to the requesting unit if the search result does not match.

According to further aspect of the present invention, there is provided a multi-core system, comprising a first cache, and one or more second caches, wherein the first cache is configured to issue a request for data to the one or more second caches; each of the one or more second caches comprises a filter configured to receive the request and compare an indicator indicative of a logical partition in the request with an indicator indicative of the logical partition in a record of the filter; wherein the filter is further configured to search in the first cache based on the request and return a search result to the one or more second caches if the comparison result matches, and to return a NONE response to the one or more second caches from the filter if the search result does not match.

BRIEF DESCRIPTION OF THE DRAWINGS

Other objects and effects of the present invention will become much clearer and more comprehensible through the following description with reference to the accompanying drawings and with more comprehensive understanding on the present invention, wherein.

DETAILED DESCRIPTION OF THE PREFERRED EMBODIMENTS

Figure 2:
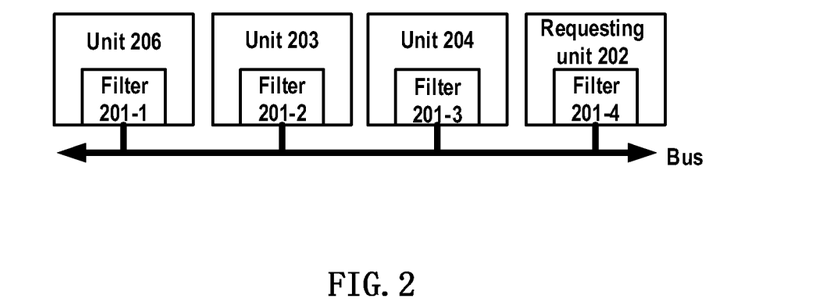
FIG. 2 shows a processing device for a request for data according to the present invention.

FIG. 2 shows a data processing system 200 in a multi-core system according to a preferred embodiment of the present invention. As shown in FIG. 2, the system 200 comprises a requesting unit 202 configured to issue a request for data; and a filter 201-1 for receiving the request for data from the requesting unit 202 and comparing an indicator indicative of a logical partition in the request with an indicator indicative of a logical partition in records of the filter 201-1.

Preferably, the requesting unit 202 performs data search in its own logical partition before issuing a request for data, and in case of not finding the required data, the requesting unit 202 issues a data request to other units, for example unit 203, 204, and 206, wherein a coherence mechanism may be existed between the requesting unit and other units.

The filter 201-1 is further configured to search in the unit 206 where the filter 201-1 is located based on the request and return a search result to the requesting unit 202 which issues the request if the comparison result matches, and to directly return a NONE response to the unit 202 which issues the request from the filter 201-1 if the search result does not match. In this way, in the case that the comparison result does not match, it is unnecessary to access the unit 206, thereby reducing data access in the multi-core system so as to reduce power consumption.

The structure of the requesting unit 202 may be identical to the structure of the unit 206.

Additionally, there may be many units 203, 204, etc., which have similar structures. The requesting unit 202 and the unit 206 are caches. Preferably, the caches may be L2 caches. The structure of the requesting unit 202 may be identical to the structure of the unit 206. Preferably, the requesting unit 202 may also comprise a filter 201-4. More preferably, the units 203 and 204 may comprise a filter 201-2 and a filter 201-3, respectively.

Additionally, based on migration of a logical partition in or from the unit 206 where the filter is located, the indicator indicative of a logical partition in a record of the filter 201-1 is dynamically updated. Preferably, the dynamic update process may be implemented under the control of a manager (not shown) similar to the manager 140 as shown in FIG. 1.

The system 200 of the present invention as shown in FIG. 2 further comprises other components, such as a bus and other hierarchy, etc. In order not to confuse the present invention, description of such components is omitted.

Figure 3:
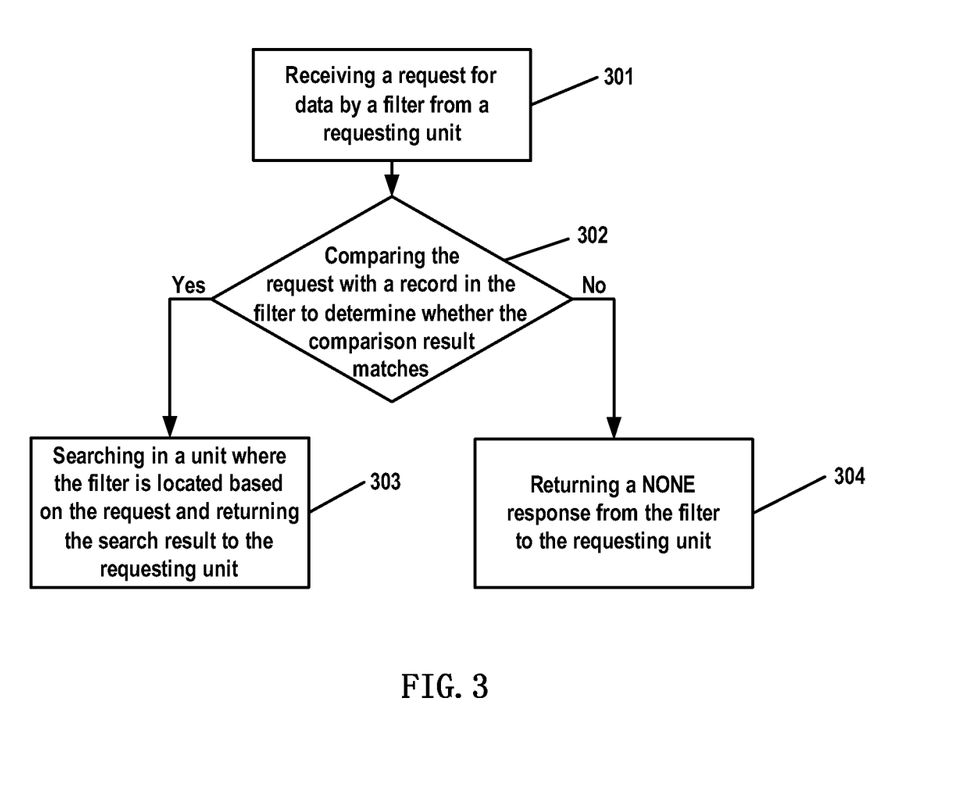
FIG. 3 shows a flow chart of a processing method for a request for data according to the present invention.

The flow chart of the method according to the present invention is shown in FIG. 3. FIG. 3 shows a flow chart of a data processing method in a cache according to an embodiment of the present invention. At step 301, a request for data is received by a filter from the requesting unit. At step 302, the indicator indicative of a logical partition in the request is compared with the indicator indicative of a logical partition in the record of the filter. If the comparison result matches, the process continues to step 303, where search is performed in the unit where the filter is located based on the request, and the search result is returned to the requesting unit. If the comparison result does not match, then the process continues to step 304, where a NONE response is returned to the requesting unit from the filter.

Figure 4:
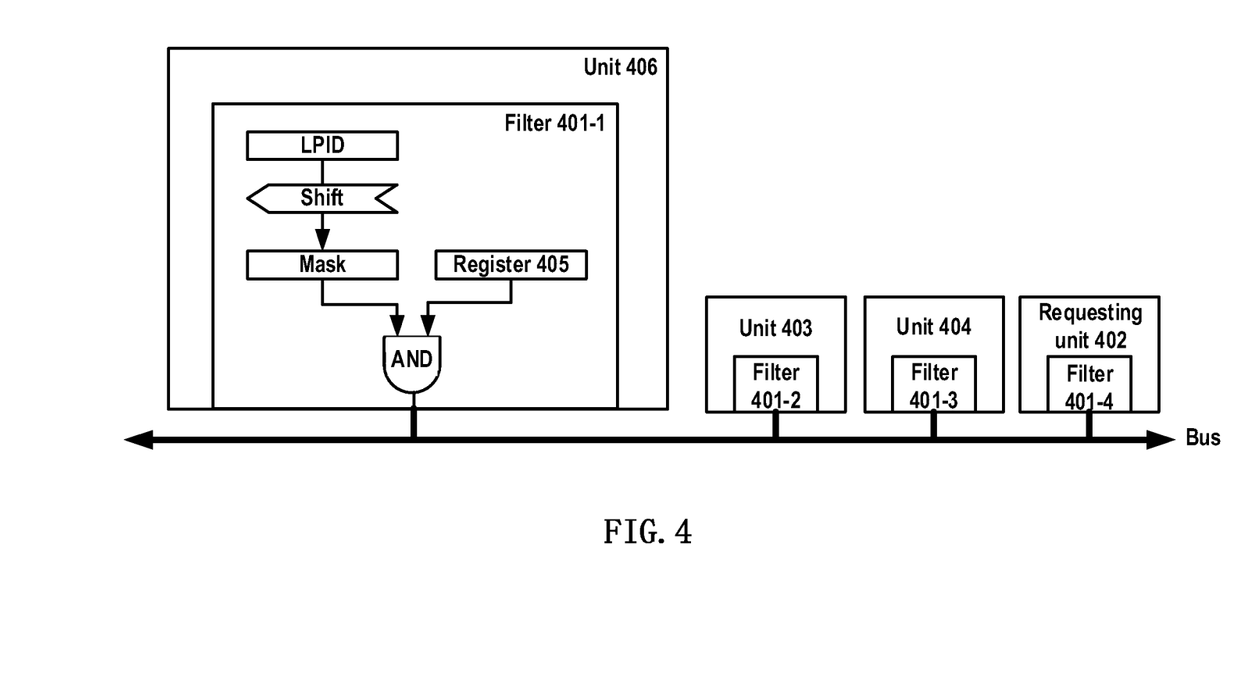
FIG. 4 shows a specific configuration of a processing device for a request for data according to an exemplary embodiment of the present invention.

FIG. 4 shows a specific configuration of a processing device for a request for data according to an exemplary embodiment of the present invention.

As shown in FIG. 4, the system 400 preferably comprises: a requesting unit 402 configured to issue a request for data, wherein the request for data is attached with a logical partition ID; and a filter 401-1 for receiving the request for data from the requesting unit 402, the filter 401-1 comprising a register 405 in which a record having an indicator indicative of a logical partition is held. The record in the register 405 is associated with a plurality of logical partitions, wherein some logical partitions of the plurality of logical partitions are located in the unit 406 where the filter 401-1 is located, and the plurality of logical partitions have their own logical partition ID, respectively. The number of logical partitions may be random or determined as required.

Preferably, the record in the filter 401-1 is associated with respective logical partition ID of the plurality of logical partitions in the multi-core system, and one bit in the indicator indicative of a logical partition in the record is used to represent a logical partition or a logical partition ID. If a logical partition is located in the unit 406 where the filter 401-1 is located, the bit location in the indicator indicative of a logical partition in the record of the filter 401-1 and associated with this logical partition (or the logical partition ID) is set as 1; if a logical partition is not located in a unit 406 where the filter 401-1 is located, the bit location in the indicator indicative of a logical partition in the record of the filter 401-1 and associated with this logical partition (or the logical partition ID) is set as 0.

The filter 401-1 is further configured to split the logical partition ID attached to the request and shift it so as to form a mask, wherein shift may be left shift or right shift. The bit width of the mask is identical to the bit width as recorded in the filter 401-1. In the mask, the bit indicative of the logical partition ID split from the request is set as "1", and all remaining bits are set as zero; if a logical partition is located in the unit 406 where the filter 401-1 is located, then the corresponding bit of the indicator indicative of the logical partition in the record is set as "1". Specifically, the mask comprises a plurality of bits, wherein if, for example, it is a second bit that indicates the split logical partition ID, then the second bit is set as "1". As to the record in the filter 401-1, if the logical partition indicated by the logical partition ID split from the request is located in the unit 406, then the second bit in the record is also set as "1" so as to indicate that the logical partition is located in the unit 406.

The filter 401-1 is further configured to perform AND operation to the mask and the indicator indicative of a logical partition in the record which have the same bit width. If the result of AND operation is none-zero, it indicates matching, and then based on the request, search is performed in unit 406 where the filter 401-1 is located, and the search result is returned to the requesting unit 402 which issues the request. If the result of AND operation is zero, it indicates no matching, and then a NONE response is directly returned from the filter 401-1 to the unit 402 which issues the request, without searching the unit 406, thereby reducing data access to achieve the object of reducing power consumption.

In this exemplary embodiment, for example, two logical partitions are present in unit 406, thus the bit positions corresponding to the two logical partitions in the indicators indicative of the logical partitions in the record of the filter 401-1 are set as 1, while the bit positions corresponding to other logical partitions are set as zero. The requesting unit 402 and the unit 406 may be caches. The caches may be L2 caches. The structure of the requesting unit 402 may be identical to the structure of the unit 406.

Additionally, based on migration of a logical partition in or from the unit 406 where the filter is located, the indicator indicative of the logical partition in the record of the filter 401 is dynamically updated. Preferably, the dynamic update process may be implemented under the control of a manager (not shown) similar to the manager 140 as shown in FIG. 1.

Additionally, there may be more units 403, 404, etc., which have similar structures. Preferably, the requesting units 402, 403, and 404 may have filters 401-4, 401-2, and 401-3, respectively. The system 400 of the present invention as shown in FIG. 4 further comprises other units, such as a bus and other hierarchy, etc. In order not to confuse the present invention, description of such components is omitted.

Figure 5:
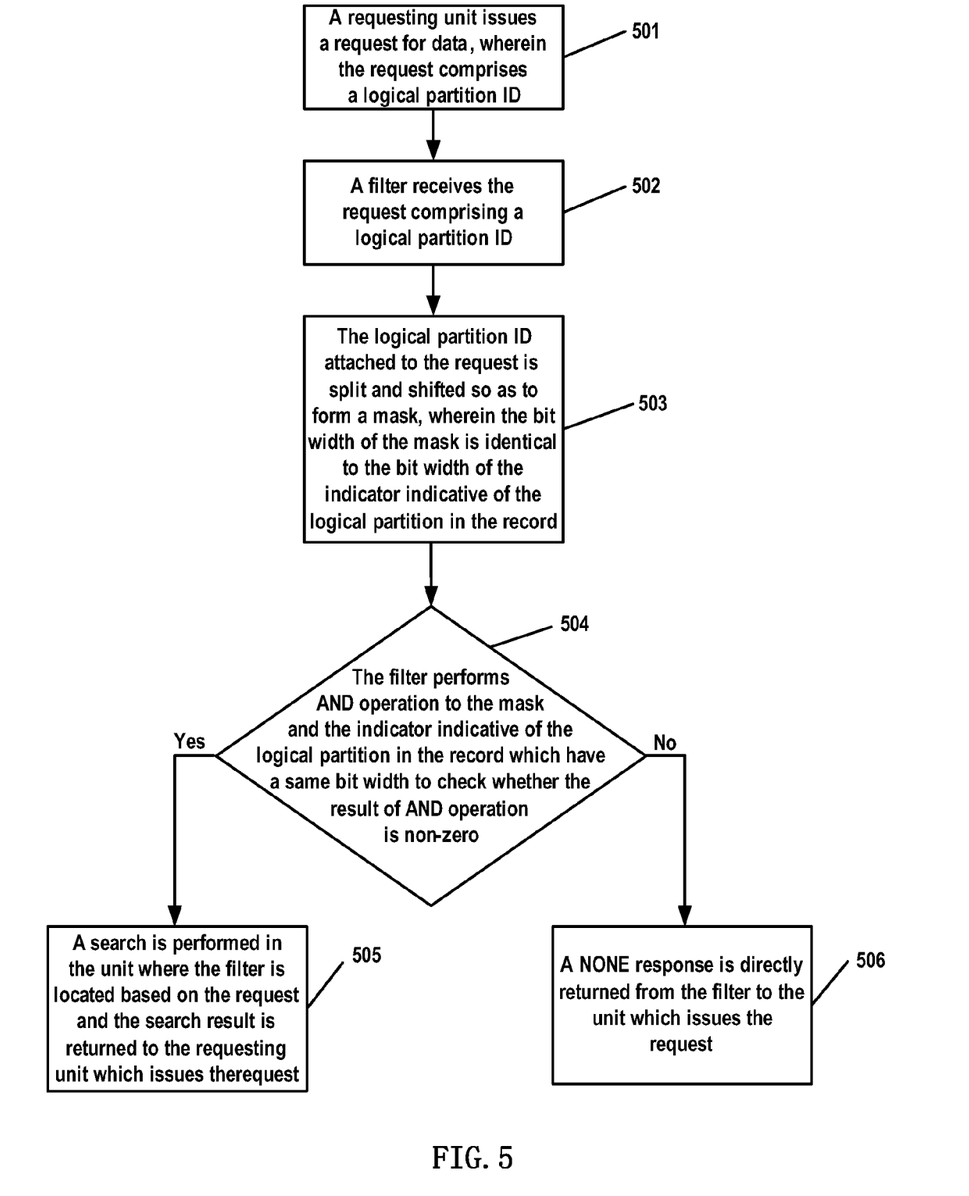
FIG. 5 shows a flow chart of a processing method for a request for data according to an exemplary embodiment of the present invention.

A method flow chart according to an exemplary embodiment of the present invention is shown in FIG. 5. FIG. 5 shows a flow chart of a processing method for a request for data according to an exemplary embodiment of the present invention. At step 501, the requesting unit issues a request for data. The request comprises a logical partition ID. At step 502, the request for data is received by a filter in which a record associated with a plurality of logical partitions, the record having indicators indicative of logical partitions is held. The plurality of logical partitions has their own logical ID, respectively. The number of logical partitions may be random or determined as required.

Preferably, the record in the filter is associated with respective logical partition ID of the plurality of logical partitions in the multi-core system, and one bit in the indicator indicative of a logical partition in the record is used to represent a logical partition or a logical partition ID. If a logical partition is located in the unit where the filter is located, the bit location in the indicator indicative of a logical partition in the record of the filter and associated with this logical partition (or the logical partition ID) is set as 1; if a logical partition is not located in a unit where the filter is located, the bit location in the indicator indicative of a logical partition in the record of the filter and associated with this logical partition (or the logical partition ID) is set as 0.

At step 503, the logical partition ID attached to the request is split from the request and shifted so as to form a mask, wherein shift may be left shift or right shift. The bit width of the mask is identical to the bit width of the indicator indicative of the logical partition in the record of the filter. Specifically, the mask comprises a plurality of bits, wherein if, for example, it is a second bit that indicates the split logical partition ID, then the second bit is set as "1". As to the record in the filter, if the logical partition indicated by the logical partition ID split from the request is located in the unit where the filter is located, then the second bit in the record is also set as "1" so as to indicate that the logical partition is located in the unit. At step 504, the filter performs AND operation to the mask and the indicator indicative of a logical partition in the record which have the same bit width to check whether the result of AND operation is non-zero. If the result of AND operation is none-zero, it indicates matching, and then at step 505, based on the request, search is performed in the unit where the filter is located, and the search result is returned to the requesting unit which issues the request. If the result of AND operation is zero, it indicates no matching, and then at step 506, a NONE response is directly returned from the filter to the unit which issues the request, without searching, thereby reducing data access to achieve the object of reducing power consumption.

Figure 6:
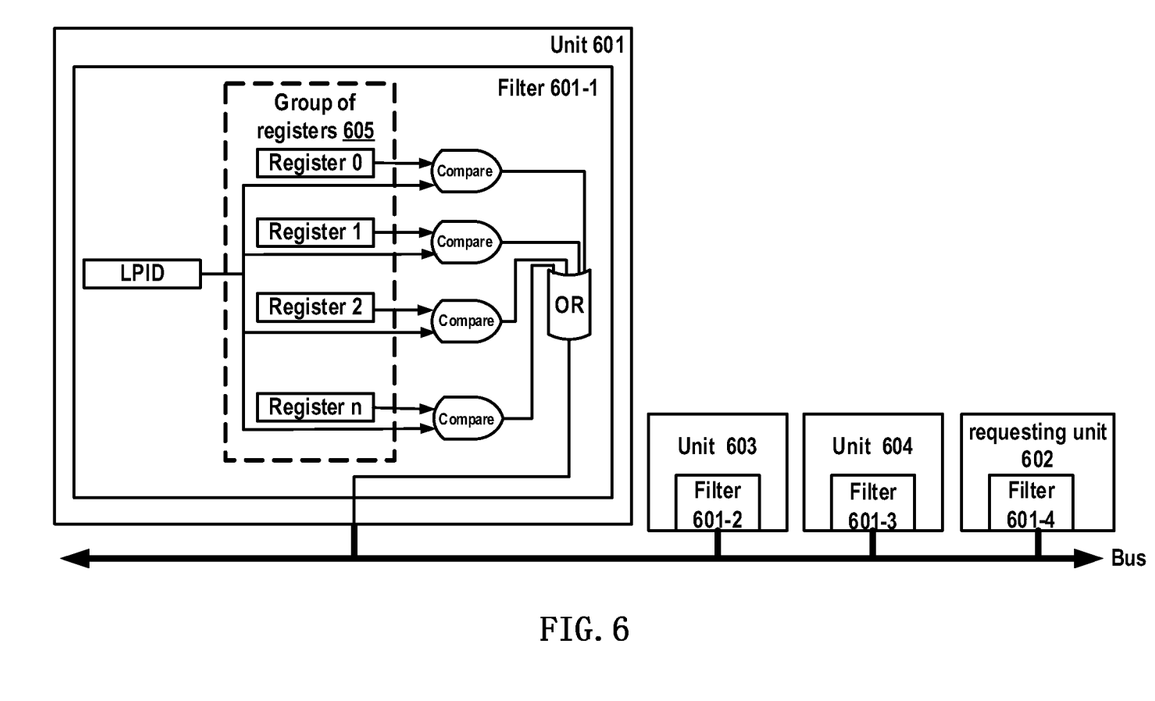
FIG. 6 shows a specific configuration of a processing device for a request for data according to another exemplary embodiment of the present invention.

FIG. 6 shows a specific configuration of a processing device for a request for data according to another exemplary embodiment of the present invention.

As shown in FIG. 6, the system 600 preferably comprises: a requesting unit 602 configured to issue a request for data, wherein the request for data is attached with a logical partition ID; and a filter 601-1 for receiving the request for data from the requesting unit 602, comprising a group of registers 605, each register in the group of registers 605 of the filter 601-1 holding a record, respectively, the record being associated with a plurality of logical partitions, wherein the plurality of logical partitions are located in the unit 606 where the filter 601-1 is located, and the plurality of logical partitions have their own logical partition ID, respectively. The record has an indicator indicative of logical partitions. The number of logical partitions may be random or determined as required.

Preferably, the record of each register (register 1, register 2, ..., register n) in the group of registers 605 is associated with the respective logical partition ID of the plurality of logical partitions in the unit 606, and the indicator indicative of logical partitions in the record is the logical partition ID of each logical partition.

The filter 601 is further configured to split the logical ID attached to the request, to compare the split logical partition ID with each logical partition ID in the record, and to perform OR operation to each comparison result. If the result of OR operation is none-zero, it indicates matching, and then based on the request, search is performed in unit 606 where the filter 601-1 is located, and the search result is returned to the requesting unit 602 which issues the request. If the result of OR operation is zero, it indicates no matching, and then a NONE response is directly returned from the filter 601-1 to the unit 602 which issues the request, without searching the unit 606, thereby reducing data access to achieve the object of reducing power consumption. The requesting unit 602 and the unit 606 are caches. Preferably, the caches may be L2 caches. The structure of the requesting unit 602 may be identical to the structure of the unit 606. Preferably, the requesting unit 602 may comprise a filter.

Additionally, based on migration of a logical partition in or from the unit 606 where the filter is located, the indicator indicative of the logical partition in the record of the filter 601 is dynamically updated. Preferably, the dynamic update process may be implemented under the control of a manager (not shown) similar to the manager 140 as shown in FIG. 1.

Further, there may be many units 603, 604, etc., which have similar structures. Preferably, the requesting units 602, 603, and 604 may have filters 601-4, 601-2, and 601-3, respectively. The system 600 of the present invention as shown in FIG. 6 further comprises other units, such as a bus 601 and other hierarchy, etc. In order not to confuse the present invention, description of such components is omitted.

Figure 7:
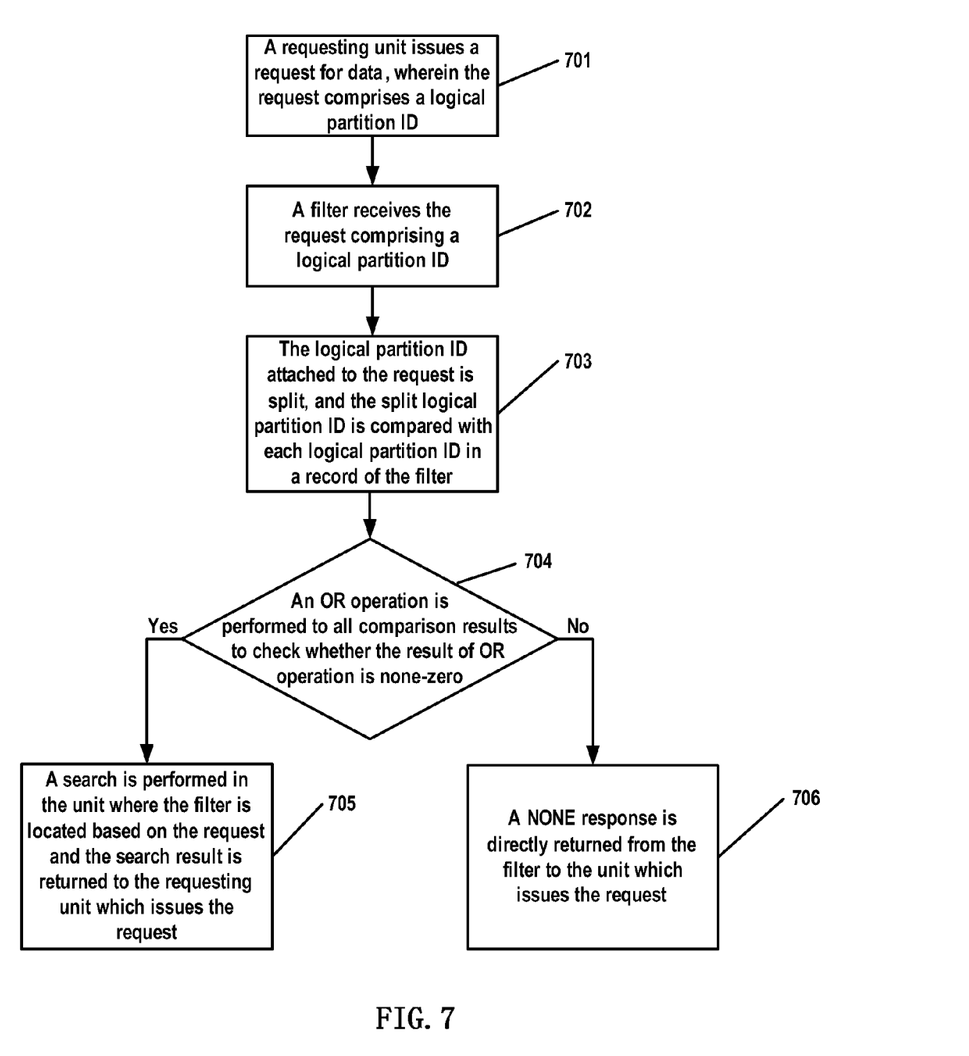
FIG. 7 shows a flow chart of a processing method for a request for data according to another exemplary embodiment of the present invention.

A method flow chart according to another exemplary embodiment of the present invention is shown in FIG. 7. FIG. 7 shows a flow chart of a processing method for a request for data according to another exemplary embodiment of the present invention. At step 701, a requesting unit issues a request for data. The request comprises a logical partition ID. At step 702, the request for data is received by a filter holding therein a record associated with a plurality of logical partitions. In other words, the record has indicators indicative of logical partitions, and the plurality of logical partitions has their own logical partition ID, respectively. The number of logical partitions may be random or determined as required. Preferably, the record in the filter is associated with the respective logical partition ID of the plurality of logical partitions, and the indicators indicative of logical partitions in the record are the logical partition ID of each logical partition. At step 703, the logical partition ID attached to the request is split, and the split logical partition ID is compared with each logical partition ID in the record. At step 704, OR operation is performed to all comparison result so as to check whether the result of OR operation is none-zero. If the result of OR operation is none-zero, it indicates matching, and then at step 705, based on the request, search is performed in the unit where the filter is located, and the search result is returned to the requesting unit which issues the request. If the result of OR operation is zero, it indicates no matching, and then at step 706, a NONE response is directly returned from the filter to the unit which issues the request, without searching the unit, thereby reducing data access to achieve the object of reducing power consumption.

It would be appreciated that the embodiments of the present invention are not limited thereto. In the filter of the present invention, any manner that is capable of determining whether the indicator indicative of a logical partition in the request matches the indicator indicative of the logical partition as held in the cache may be adopted, which is not limited to the above two operations as specifically provided by the present invention.

Figure 8:
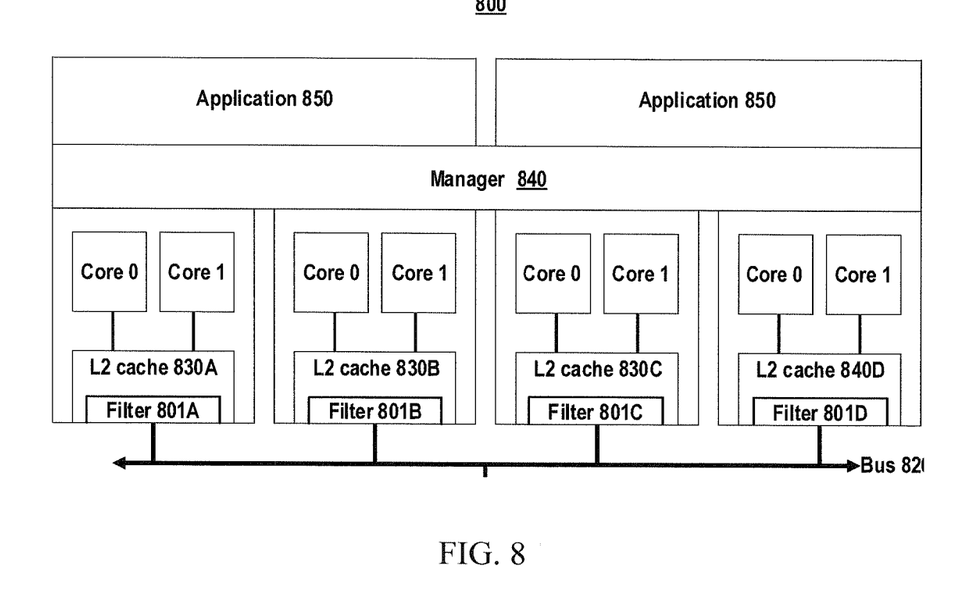
FIG. 8 shows a structural schematic diagram of a multi-core system in which the present invention may be implemented.

FIG. 8 shows a structural schematic diagram of a multi-core system 800 in which the present invention may be implemented. The multi-core system 800 comprises: a first cache such as L2 cache 830A, and one or more second caches such as L2 caches 830B, 830C, and 830D, wherein the first cache is configured to issue a request for data to the one or more second caches. Each of the one or more second caches comprises a filter (for example, filters 801B, 801C, and 801D), which is configured to receive the request and compares the indicator indicative of a logical partition in the request with the indicator indicative of the logical partition in a record of the filter. The filter is further configured to perform search in the first cache based on the request if the comparison result matches and to return the search result to the one or more second caches. A NONE response is returned from the filter to the one or more second caches if the comparison result does not match.

More preferably, the multi-core system 800 comprises: a memory 810, a bus 820, a plurality of L2 caches 830A, 830B, 830C, and 830D, a manager 840, and a plurality of applications 850, wherein each of a plurality of L2 caches 830A, 830B, 830C, and 830D comprises one or more logical partitions and filters 801A, 801B, 801C, and 801D, respectively. When a request for data is issued from a L2 cache 830A thereof to other L2 caches 830B, 830C, and 830D, the request for data is transmitted from the system bus 820 to the L2 caches 830B, 830C, and 830D.

In L2 caches 830B, 830C, and 830D, the request for data is firstly processed at the filter. Specifically, for example, when the request for data reaches the filter 801B of the L2 cache 830B, the filter 801B compares the indicator indicative of a logical partition in the request with the indicator indicative of the logical partition in the record as held in the filter 801B. If the comparison result matches, then based on the request, search is performed in the L2 cache 830B, and the search result is returned to the L2 cache 830A which issues the request. If the comparison does not match, a NONE response is directly returned from the filter 801B to the L2 cache 830A. Likewise, similar operations are also performed in the L2 caches 830C and 830D. Though this filter mechanism, vain data access operation may be avoided, thereby reducing power consumption in the L2 cache and improving the power efficiency of the processing system.

It should be noted that in order to make the present invention more comprehensible, the above description omits some more specific technical details which are known to the skilled in the art and may be essential to implement the present invention.

The purpose for providing the description of the present invention is to explain and describe, not to exhaust or limit the present invention within the disclosed form. Various modifications and alternations are obvious to a person of normal skill in the art.

Thus, selecting and describing the embodiments is to better illustrate the principle and practical application of the present invention and to enable a person of normal skill in the art to appreciate that without departing the spirit of the present invention, all modifications and alterations fall within the protection scope of the present invention as limited by the appending claims.

What is claimed is:

1. A method for processing a request in a multi-core system, said multi-core system including multiple processors, each processor having a respective cache memory, said method comprising:
   receiving, at a filter in a cache associated with a second processor, a request for data from a requesting cache associated with a first processor;
   comparing an indicator indicative of a logical partition in the request with an indicator indicative of a logical partition in a record of the filter in the cache associated with the second processor;
   searching in the cache associated with the second processor where the filter is located based on the request and returning a search result to the requesting cache associated with the first processor if the comparison result matches; and
   returning a NONE response to the requesting cache associated with the first processor from the filter if the comparison result does not match.

2. A method according to claim 1, wherein the indicator indicative of a logical partition in the request is one or more logical partition IDs, and the indicator indicative of a logical partition in the record indicates one or more logical partitions ID in the cache where the filter is located.

3. A method according to claim 2, wherein the one or more logical partition IDs in the request are split from the request and shifted so as to form a mask, wherein the bit width of the mask is identical to the bit width of the indicator indicative of a logical partition in the record.

4. A method according to claim 3, wherein in the mask, the bit indicative of the logical partition IDs split from the request is set as "1", and all remaining bits are set as zero; if a logical partition is located in the cache where the filter is located, the corresponding bit of the indicator indicative of a logical partition in the record is set as "1".

5. A method according to claim 3, wherein the matching step comprises: performing AND operation to the mask and the indicator indicative of a logical partition in the record which have a same bit width, wherein if the result is non-zero, it indicates matching; and if the result is zero, it indicates not matching.

6. A method according to claim 2, wherein the one or more logical partition IDs split from the request are compared with all logical partition IDs in the record, and performing "OR" operation to all comparison results, wherein if the result is non-zero, it indicates matching; and if the result is zero, it indicates not matching.

7. A method according to claim 1, wherein the indicator indicative of a logical partition in the record is dynamically updated based on migration of the logical partition in or out of the cache where the filter is located.

8. A device for processing a request in a multi-core system, said multi-core system including multiple processors, each processor having a respective cache memory, said device comprising:
   a filter configured to receive a request for data from a requesting cache associated with a first processor which issues out a request and to compare an indicator indicative of a logical partition in the request with an indicator indicative of a logical partition in a record of the filter;
   wherein the filter is further configured to search the cache where the filter is located based on the request and to return a search result to the cache which issues out the request if a comparison result matches; and
   to return a NONE response to the cache which issues out the request if the comparison result does not match.

9. A device according to claim 8, wherein the indicator indicative of a logical partition in the request comprises one or more logical partition IDs, and the indicator indicative of a logical partition in the record indicates one or more logical partition IDs in the cache where the filter is located.

10. The device according to claim 8, wherein the filter comprises a register, the record being generated and held by the register, an indicator indicative of a logical partition in the record indicating one or more logical partition IDs in the cache where the filter is located.

11. A device according to claim 9, wherein the one or more logical partition IDs in the request are split from the request and shifted to form a mask, wherein the bit width of the mask is identical to the bit width of the indicator indicative of a logical partition in the record.

12. A device according to claim 11, wherein:
   in the mask, the bit indicative of the logical partition ID split from the request is set as "1", and all remaining bits are set as zero; if a logical partition is located in the cache where the filter is located, the corresponding bit of the indicator indicative of logical partition in the record is set as "1".

13. A device according to claim 11, wherein the matching step comprises: performing AND operation to the mask and the indicator indicative of a logical partition in the record which have a same bit width, wherein if the result is non-zero, it indicates matching; and if the result is zero, it indicates not matching.

14. A device according to claim 9, wherein the one or more logical partition IDs split from the request are compared with all logical partition IDs in the record, and "OR" operation is performed to all comparison results, wherein if the result is non-zero, it indicates matching; and if the result is zero, it indicates not matching.

15. A device according to claim 8, wherein the device is implemented in a L2 cache.

16. A device according to claim 8, wherein the requesting cache and the cache where the filter is located are L2 caches.

17. A device according to claim 8, wherein the indicator indicative of a logical partition in the record is dynamically updated based on migration of the logical partition in or from the cache where the filter is located.

18. A multi-core system including multiple processor cores, each processor core having a respective cache device, said system comprising:
   a first cache;
   one or more second caches;
      wherein the first cache is configured to issue a request for data to the one or more second caches, each of the one or more second caches comprising a filter which is configured to receive the request and to compare an indicator indicative of a logical partition in the request with an indicator indicative of the logical partition in a record of the filter;
      wherein, the filter is further configured to perform search in a respective second cache based on the request and to return the search result to the first cache if the comparison result matches; and
      to return a NONE response from the filter to the first cache if the comparison result does not match.

* * * * *